Figure 1:
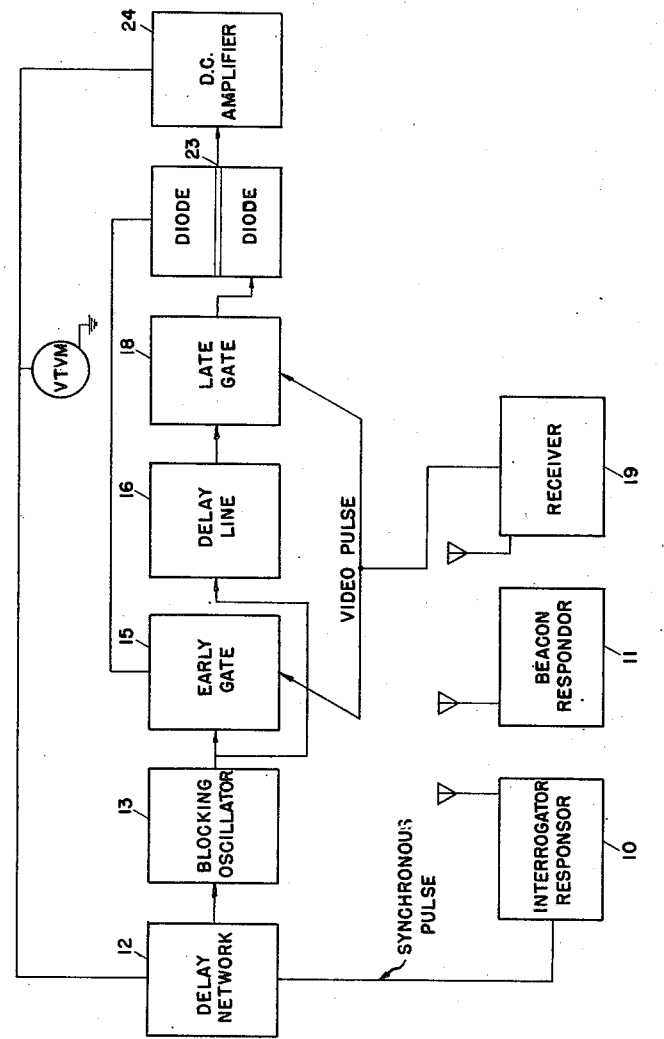

Aug. 14, 1951     W. M. YOST     2,563,902
MULTIPLE PULSE GATING

Filed March 22, 1950     2 Sheets-Sheet 1

INVENTOR.
WILLIAM M. YOST

BY
Harry M. Saragovitz
Attorney

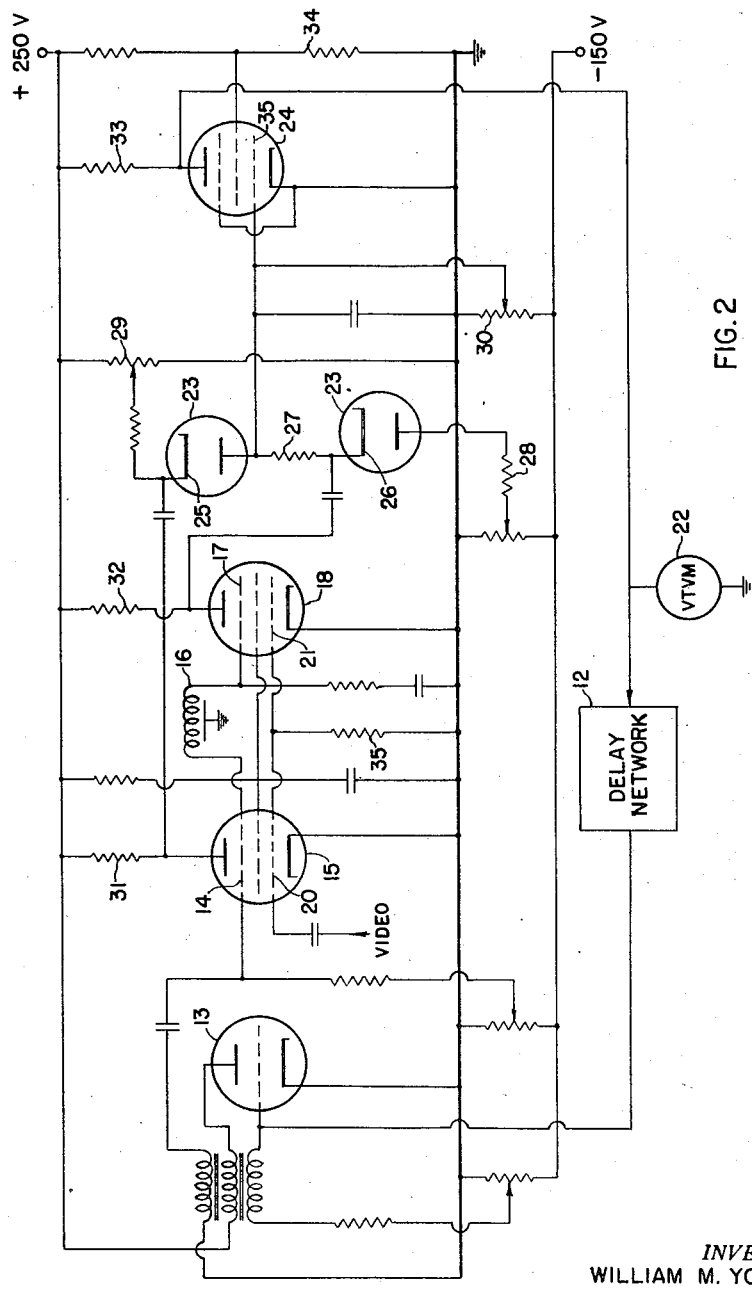

Patented Aug. 14, 1951

2,563,902

UNITED STATES PATENT OFFICE 2,563,902

MULTIPLE PULSE GATING

William M. Yost, Dayton, Ohio

Application March 22, 1950, Serial No. 151,252

4 Claims. (Cl. 250—27)

(Granted under the act of March 3, 1883, as amended April 30, 1928; 370 O. G. 757)

The invention described herein may be manufactured and used by or for the Government for governmental purposes, without the payment of any royalty thereon.

The present invention relates to gating employed in navigational and other ranging radar.

This application is a continuation-in-part of my copending application, Serial Number 581,265, filed March 6, 1945, for "Multiple Pulse Gating."

The invention is applicable as an improvement in the gating network employed in the range determining circuits described in a copending application, Serial Number 553,859, filed September 13, 1944, and has the advantage of eliminating a multiplicity of pulse generating oscillators, thereby improving balance, stability and accuracy of the range determining circuits.

The novelty of this invention resides in the manner of utilizing a delay line to produce a pair of gating pulses in two tubes, designated respectively as early gate tracking tube and late gate tracking tube, by means of a single blocking oscillator, said pulses being spaced a fixed and predetermined interval of time so that unbalance or error due to variation in this spacing because of different oscillator sources of the two pulses cannot enter into the range indication. If any variation should occur in the blocking oscillator output of this invention, creating a shift of the pulse output, both early and late gate pulses will be shifted an amount equal to the variation, and thus maintain balance at all times regardless of shift. The employment of only one blocking oscillator to produce the two pulses results in a saving of power, simplification and reduction of weight of equipment, and elimination of critical bias adjustments.

An object of this invention is to employ a delay line to produce a fixed time interval delay between a pair of pulses in a gating network by means of a single blocking oscillator.

Another object is to provide circuit means for spacing the early and late gate pulses a fixed and predetermined time apart so that unbalance due to variation in the pulse spacing cannot enter into the range indication.

A further object is to provide circuit means to control the position of the range indicator in a range meter in such a fashion as to follow or track the true indication of the video pulse from a beacon transpondor or target.

Other objects and features of novelty will be apparent from the following description and the annexed drawings, it being clearly understood, however, that the invention is not limited in any way by such description and drawings, or otherwise than by the appended claims.

Referring to the drawings, in which similar reference numerals refer to like parts, Fig. 1 is a diagram designating in block form the interconnection of the components of this invention with components of interrogator-responsor equipment and the manner in which a video signal from a beacon transpondor is coupled to the early and late gate tubes of a receiver gating network, and a delay line to produce a pair of early and late gate pulses for coincidence with the video signal pulse.

Fig. 2 is a diagram illustrating in a schematic form the components of this invention and in block form the manner in which these components are employed in combination with known interrogator-responsor equipment.

In the present embodiment wherein this invention is employed, an interrogator-responsor 10 transmits a pulse signal to a beacon-responder 11, and simultaneously transmits a synchronous pulse to a delay network 12. Delay network 12 may comprise, for example, a delay multi-vibrator which is arranged so that the trailing edge of the multi-vibrator output pulse resulting from the synchronous pulse can be delayed over the 100 mile range of the equipment by varying the biasing potentials applied thereto, a linear forming network to maintain a constant output from the multi-vibrator for the 100 mile range, and a composite differentiating network to differentiate the output of the multi-vibrator to produce a delayed triggering pulse coincident with the trailing edge of the multi-vibrator output pulse. The delayed pulse from delay network 12 is applied to blocking oscillator 13 which is biased to cut-off at the end of one cycle. The positive output pulse from blocking oscillator 13 is fed to grid 14 of early gate tube 15 and through delay line 16 to the grid 17 of late gate tube 18, so that the trailing edge of the output pulse from early gate tube 15 appears simultaneously with leading edge of the output pulse from late gate tube 18. Hereinafter the positive pulses applied to grids 14 and 17 will be designated as "gate pulse" and "delayed gate pulse" respectively. The positive plate potential is applied to the plates of tubes 15 and 18 through resistors 31 and 32.

Beacon-responder 11, in response to the pulses from interrogator-responsor 10, constantly responds and produces video pulses in receiver 19 which are applied simultaneously to grid 20 of early gate tube 15 and grid 21 of late gate tube 18. If the received video pulse coincides in time with the gate pulses applied to the early and late gate tubes, the plate output voltage of tubes 15 and 18 will be equal. Coincidence of the video pulse with the gate pulses in both tubes indicates that the video signal and the gate pulse in each of the gate tubes are equal, and the indication on vacuum tube voltmeter 22 will be actual range between the aircraft and the beacon. If the gate pulse applied to early tube 15 is not present simultaneously with the video signal applied to tube 15, or if the delayed gate pulse applied to late tube 18 is not present simultaneously with the video signal applied to tube 18, there will be no voltage output either in tube 15 or in tube 18, because the tubes are biased below cut-off, and the combined voltage of the video and gate pulses are required to bring these tubes to conduction. The condition of non-coincidence occurs because the receiver is moving with the aircraft, and the video pulse is constantly shifting with respect to the gate pulses since the video pulse moves in or out with the aircraft relative to the range of beacon 11. Inasmuch as the gate pulses control the indicating position of the range meter 22, means must be provided to cause the indicator of range meter 22 to follow or track the true position indication of the video pulse. Conventional tracking of the video pulse with gate pulses generated in separate tubes is adequately described in said co-pending application, Serial Number 553,859, and therefore will not be described in detail herein.

In order to bring about the automatic electronic tracking which is a novelty of this device, the outputs of early gate tube 15 and late gate tube 18 are fed through a dual diode tube 23 and a D. C. amplifier tube 24 which controls delay of the gate pulses so that they coincide with the video pulse. The plate of D. C. amplifier 24 is connected to the +250-volt source through resistor 33. The output of early gate tube 15 is fed to cathode 25 of one portion of dual diode tube 23 and the output of late gate tube 18 is fed to cathode 26 of the other portion of dual diode tube 23. The output of the diode fed from early gate tube 15 is connected directly to the control grid of tube 24. The output of the diode fed from late gate tube 18 is coupled to the control grid of tube 24 through resistor 27. The result is a rise or fall of voltage in the input and amplified output of amplifier 24, depending on which gate tube has the greater output, and consequently, this difference of output will determine whether a greater or lesser negative potential will be applied to input grid 35 of amplifier 24. The voltages on the cathodes and plates of both diodes are adjusted by potentiometers 28, 29 and 30, so that both diodes are normally non-conducting. The bias on control grid 35 of tube 24 is so adjusted that meter 22 will normally indicate zero range. If the early gate tube 15 has a greater output due to coincidence of the gate pulse with the video pulse and lack of simultaneous coincidence of the video pulse with the delayed gate pulse in late gate tube 18, then the diode to which the output of early gate tube 15 is applied will conduct and, as a result, the negative output from tube 15 will be applied to the control grid 35 of tube 24. The D. C. output of amplifier 24 will increase because a greater negative potential is impressed on grid 35 of amplifier 24, thereby causing less current drain through the plate of amplifier 24. If, however, late gate tube 18 has a greater output due to coincidence of the delayed gate pulse with the video pulse and lack of simultaneous coincidence of said video pulse with the gate pulse in the early gate tube 15, then the diode to which the output of the late gate tube is applied will conduct, thereby shunting resistance 27. Accordingly, the plate voltage of amplifier 24 will decrease because a lesser negative potential was impressed on the grid of amplifier 24 from late gate tube 18, since resistor 27 is now shunted by the diode to which the output of the late gate tube is applied, thereby causing more plate current drain and consequent voltage decrease in the plate circuit of amplifier 24. When an increased or decreased voltage in the plate circuit of amplifier 24 results, this voltage, feeding back to the control tube in delay network 12, will control the position of the triggering pulse by affecting the delay and thereby advancing or retarding the gate pulses in time so as to equalize the position of the gate pulse to the point where the gate pulse in early gate tube 15 and the delayed gate pulse in late gate tube 18 have a simultaneous coincidence with the video in each of the gate tubes, thereby restoring them to an equal or balanced output condition such as exists when the trailing edge of the output of early gate tube 15 appears simultaneously with leading edge of the output of late gate tube 18, thus coinciding with the video pulse.

The above description is related to the extreme condition of unbalance of tubes 15 and 18 due to the total absence of the video in one of the tubes. It should be understood, however, that there will also be a variation of the degree of unbalance, depending on the period of time in which there is partial coincidence between gate and video pulses in one or the other, or both gate tubes.

In employing the invention with navigational radar, the operator will ordinarily manually shift the gate pulses along the range sweep until the gate pulses are in coincidence with a beacon video signal. When this happens the gate pulses and video lock together and actuate a relay controlling a signal lamp which remains energized during the "locked" condition. While it is so "locked," the lamp is alternately lighted and extinguished in coded sequence so that the beacon may be identified. Also, during this "locked" condition, the tubes 15 and 18 are mixing the video pulses with the gate pulses so as to increase or decrease the output voltage from amplifier 24 to hasten or retard the occurrence of the gate pulses and thereby follow the video signal (which moves with the aircraft).

By observing the coded signal of the indicator lamp, the operator may decide that the particular beacon transmitter is not the desired one, and he will "unlock" the gate pulses from this particular video signal and resume searching by manually moving the gate pulses in either range direction until the gate pulses "lock" on to another beacon video signal, at which time the indicator lamp will again be energized. This process may be repeated along the full range scale of the radar.

If automatic strobe sweep is employed, the operator will periodically operate the "unlock" control to "unlock" from undesired beacons.

While the invention has been described in connection with navigational radar, it will be understood by those familiar with the art that coincidence control method herein described will have other and different applications, and accordingly it is to be understood that such broad range of applications is contemplated.

What is claimed is:

1. In a range determining apparatus, a pulse gating system comprising in combination a synchronous pulse generating source, a variable delay network to delay said pulse a predetermined time, a single swing blocking oscillator responsive to the delayed output of said network, a first and second gating tube each having at least two grids and normally biased to cutoff, means for coupling the output of said blocking oscillator to the first grid of the first gating tube and through delay means to the first grid of said second gating tube for delaying the incoming pulse applied to said second gating tube whereby the leading edge of the incoming pulse applied to the grid of said second gating tube substantially coincides with the trailing edge of the incoming pulse applied to the grid of said first gating tube, means for simultaneously coupling a video signal to a second set of corresponding grids of said gating tubes, said gating tubes being rendered conductive only when said video signal simultaneously coincides with both incoming pulses, and means responsive to the output of said gating tubes to maintain the simultaneous coincidence of said video signal with both of said gating pulses.

2. The claim set forth in claim 1 wherein the means to maintain simultaneous coincidence includes a direct current amplifier having at least a control grid, a plate and a cathode, a first diode normally biased to cut-off, connected in series between the output of said first gating tube and said control grid and having its plate connected to said control grid, said first diode being rendered conductive only when the output of said first gating tube exceeds the output of said second gating tube whereby the output of said first gating tube is coupled to said control grid, a second diode normally biased to cut-off connected in series with the output of said second gating tube, a resistor interconnecting the cathode of said second diode and the plate of said first diode, said second diode being rendered conductive only when the output of said second gating tube exceeds the output of said first gating tube whereby the output of said second gating tube is applied to said control grid, and means in circuit with said delay network responsive to the output of said direct current amplifier to delay the synchronous pulse until said video signal coincides with both incoming pulses.

3. In a range determining apparatus, a pulse gating system comprising a synchronous pulse generating source, a first and second gating tube each having at least two grids and normally biased to cut-off, means for coupling the output of the pulse generating source to the first grid of said first gating tube, a delay line interconnecting the first grid of the first gating tube and the corresponding grid of the second gating tube for delaying the incoming pulse applied to said second gating tube whereby the leading edge of the incoming pulse applied to the grid of said second gating tube substantially coincides with the trailing edge of the incoming pulse applied to the grid of said first gating tube, means for simultaneously coupling a video signal to a second set of corresponding grids of said gating tubes, said gating tubes being rendered conductive only when said video signal simultaneously coincides with both incoming pulses, and means responsive to the output of said gating tubes to maintain a simultaneous coincidence of said video signal with both of said incoming pulses.

4. In a range determining apparatus, a pulse gating system comprising in combination a synchronous pulse generating source, a variable delay network to delay said pulse a predetermined time, a single swing blocking oscillator responsive to the delayed output of said network, a first and second gating tube each having at least two grids and normally biased to cut-off, means for coupling the output of said blocking oscillator to the first grid of the first gating tube and through delay means to the first grid of the second gating tube for delaying the incoming pulse applied to said second gating tube whereby the leading edge of the incoming pulse applied to the grid of said second gating tube substantially coincides with the trailing edge of the incoming pulse applied to the grid of said first gating tube, means for simultaneously coupling a video signal to a second set of corresponding grids of said gating tubes, said gating tubes being rendered conductive to produce balanced outputs only when said video signal simultaneously coincides with both incoming pulses, a direct current amplifier having at least a control grid, a plate and a cathode, a first diode responsive only to the output of said first gating tube when the output thereof exceeds the output of said second gating tube, said first diode having its output applied directly to said control grid, a second diode responsive only to the output of said second gating tube when the output thereof exceeds the output of said first gating tube, said second diode having its output applied to said control grid through a resistor, and means in circuit with said delay network responsive to the output of said direct current amplifier to delay the synchronous pulse until such video signal coincides with both incoming pulses to maintain balanced outputs from both gating tubes.

WILLIAM M. YOST.

REFERENCES CITED

The following references are of record in the file of this patent:

UNITED STATES PATENTS

| Number | Name | Date |
| --- | --- | --- |
| 2,482,544 | Jacobsen | Sept. 20, 1949 |